US007757712B2

(12) United States Patent
Kadow et al.

(10) Patent No.: US 7,757,712 B2
(45) Date of Patent: Jul. 20, 2010

(54) COUPLING DEVICE FOR A COMPRESSED GAS CYLINDER

(75) Inventors: Peter Kadow, Berlin (DE); Peter Kling, Berlin (DE); Thomas Kuba, Schulzendorf (DE); Wolfgang Weber, Berlin (DE)

(73) Assignee: MSA AUER GmbH (DE)

( * ) Notice: Subject to any disclaimer, the term of this patent is extended or adjusted under 35 U.S.C. 154(b) by 469 days.

(21) Appl. No.: 11/596,265

(22) PCT Filed: May 9, 2005

(86) PCT No.: PCT/DE2005/000874

§ 371 (c)(1), (2), (4) Date: Jan. 22, 2008

(87) PCT Pub. No.: WO2005/111478

PCT Pub. Date: Nov. 24, 2005

(65) Prior Publication Data

US 2008/0236687 A1 Oct. 2, 2008

(30) Foreign Application Priority Data

May 13, 2004 (DE) ....................... 10 2004 024 597

(51) Int. Cl.
*F16L 37/00* (2006.01)

(52) U.S. Cl. ............................ 137/614.03; 137/614.05; 251/149.6

(58) Field of Classification Search ............ 137/614.03, 137/614.04, 614.05, 614; 251/149.1, 149.6
See application file for complete search history.

(56) References Cited

U.S. PATENT DOCUMENTS 3,938,564 A * 2/1976 Jones ..................... 137/614.03
5,139,049 A * 8/1992 Jensen et al. ........... 137/614.03

* cited by examiner

*Primary Examiner*—Kevin L Lee
(74) *Attorney, Agent, or Firm*—Wood, Phillips, Katz, Clark & Mortimer

(57) ABSTRACT

A coupling for a compressed gas cylinder (2) includes a separate coupling part (12) that can be screwed to the standardized fitting (3) on the cylinder valve (1). The connection to the coupling means (7) of a pressure reducer (6) or the like is provided by plug-and-socket-type connecting means that can be plugged into each other, interlocked, and closed off by means of locking elements to prevent contamination from outside, the locking element provided on the coupling part at the same time forming a blow-off protection that allows only a limited gas flow when the cylinder valve is opened in uncoupled condition.

7 Claims, 4 Drawing Sheets

COUPLING DEVICE FOR A COMPRESSED GAS CYLINDER

The invention relates to a coupling for a compressed gas cylinder to connect the standardized fitting on the cylinder valve with the coupling means on a consumer, a manifold, or a filling station, especially for compressed air breathing apparatuses.

The compressed air cylinders that come with compressed air breathing systems comprise a fitting in the area of the cylinder valve that mostly is perpendicular to the longitudinal axis of the compressed air cylinder and has a female thread. The design of compressed air cylinders with such a fitting is defined by standardization and cannot be altered. Connecting the compressed air cylinder, for example, to a pressure reducer or manifold piece of a compressed air breathing apparatus can prove difficult because the fitting of the cylinder or the male threaded coupling piece or manifold piece on the pressure reducer that can be turned using a hand wheel can easily get jammed when put against the heavy filled cylinder, in particular when the cylinder has to be replaced fast while the apparatus is in use. Making the screwed connection then takes even more time than usual. In addition, making such a connection under operating conditions such as during a fire fighting mission does not ensure that this connection will be safe and gastight. Apart from the safety risk, the gas that escapes under high pressure when the cylinder valve is opened may damage the gasket or the cylinder fitting if the connection is not gastight.

It is the object of the invention to develop a coupling based on the standardized female thread of a compressed gas cylinder that facilitates simple, fast, and safe coupling of the compressed air cylinder to a consumer even under difficult operating conditions and safe handling even when uncoupled.

This object is achieved according to the invention by the coupling comprising the characteristics described in claim 1.

The inventive idea is to provide a separate coupling part inserted between the compressed gas cylinder and, for example, the pressure reducer of a compressed air breathing apparatus that can be screwed into the standard fitting of the compressed air cylinder and can fast and safely be connected to the pressure reducer used as an example here using pin and socket connecting means. Especially when replacing the compressed air cylinders of compressed air breathing apparatuses while these are in use, such a coupling is highly advantageous as the connection is made by just plugging two plug-and-socket-type elements together. The plug and socket connection is designed so that spring-loaded closing elements are placed on the open sides of the two coupling elements which cover the coupling side when the element is not coupled, thus preventing contamination and ensuring a safe coupling process at all times. When the elements are coupled, the respective other of the coupling elements moves the locking element of the one in axial direction when coupling to open the gas passage. The locking element on the coupling part that is connected to the compressed air cylinder simultaneously works as a blow-off protection in that, when the cylinder valve is inadvertently opened and the cylinder is not coupled, a small stream of compressed air flows off via the spring-loaded locking element, which prevents accidents due to gas escaping suddenly at a high speed. The two coupling elements further comprise latching means for locking the plug and socket connection, such interlocking being achieved by a manual rotating and pushing motion of an actuator provided on the coupling element so that there can be no automatic release of the plug and socket connection. Due to the design as a plug and socket connection in combination with the closing and latching elements, the coupling according to the invention meets the requirements of a high level of safety and fast connectibility.

The dependent claims disclose further characteristics and preferred embodiments of the invention.

An embodiment of the invention is explained in greater detail below with reference to the figures. Wherein.

Figure 1:
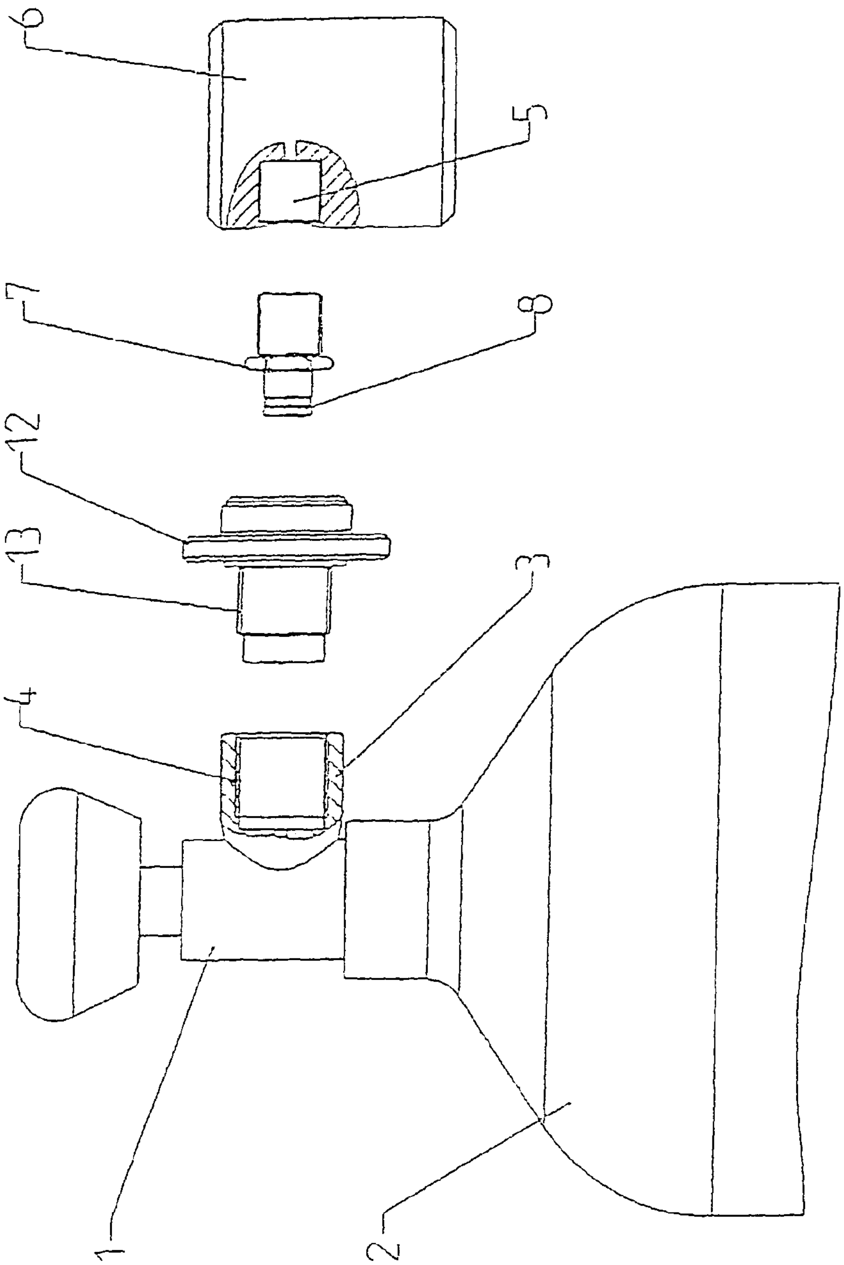
FIG. 1 is an exploded side view of the coupling between a compressed air cylinder and a pressure reducer of a compressed air breathing apparatus.
Figure 2:
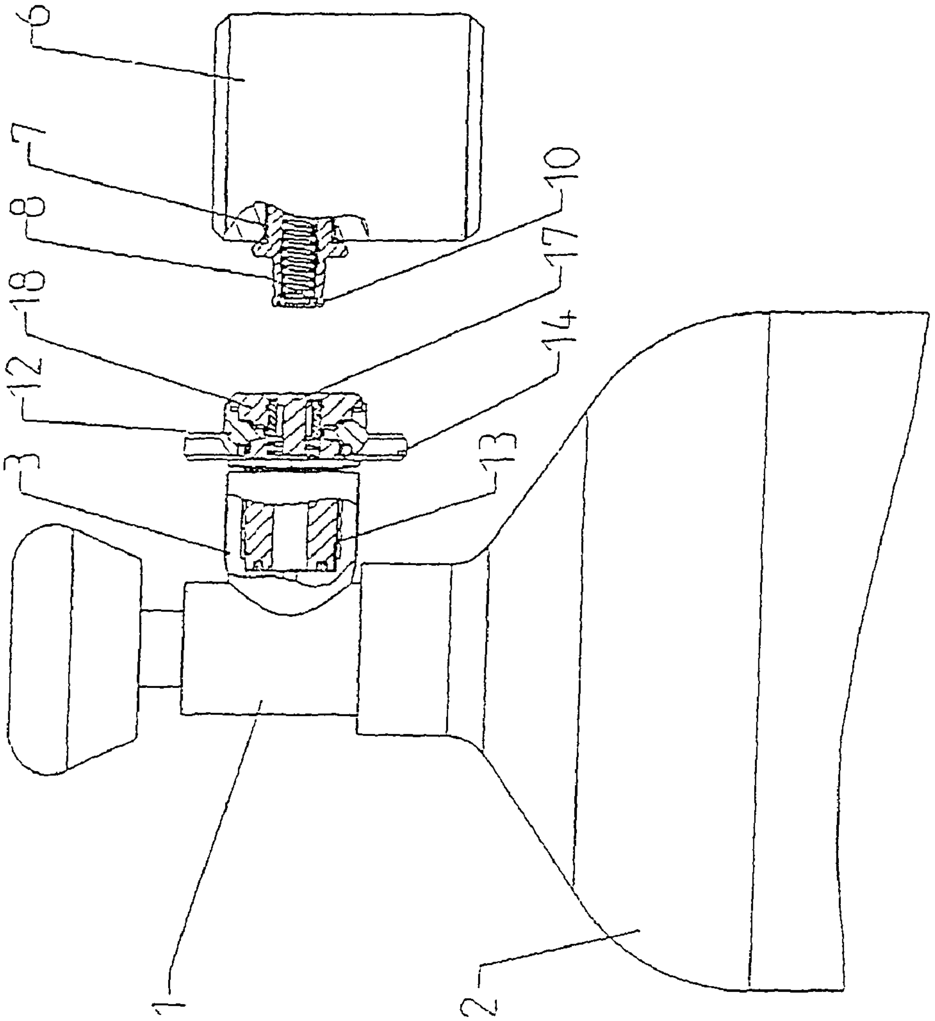
FIG. 2 shows the coupling between compressed air cylinder and pressure reducer according to FIG. 1 in mounted but uncoupled condition.
Figure 3:
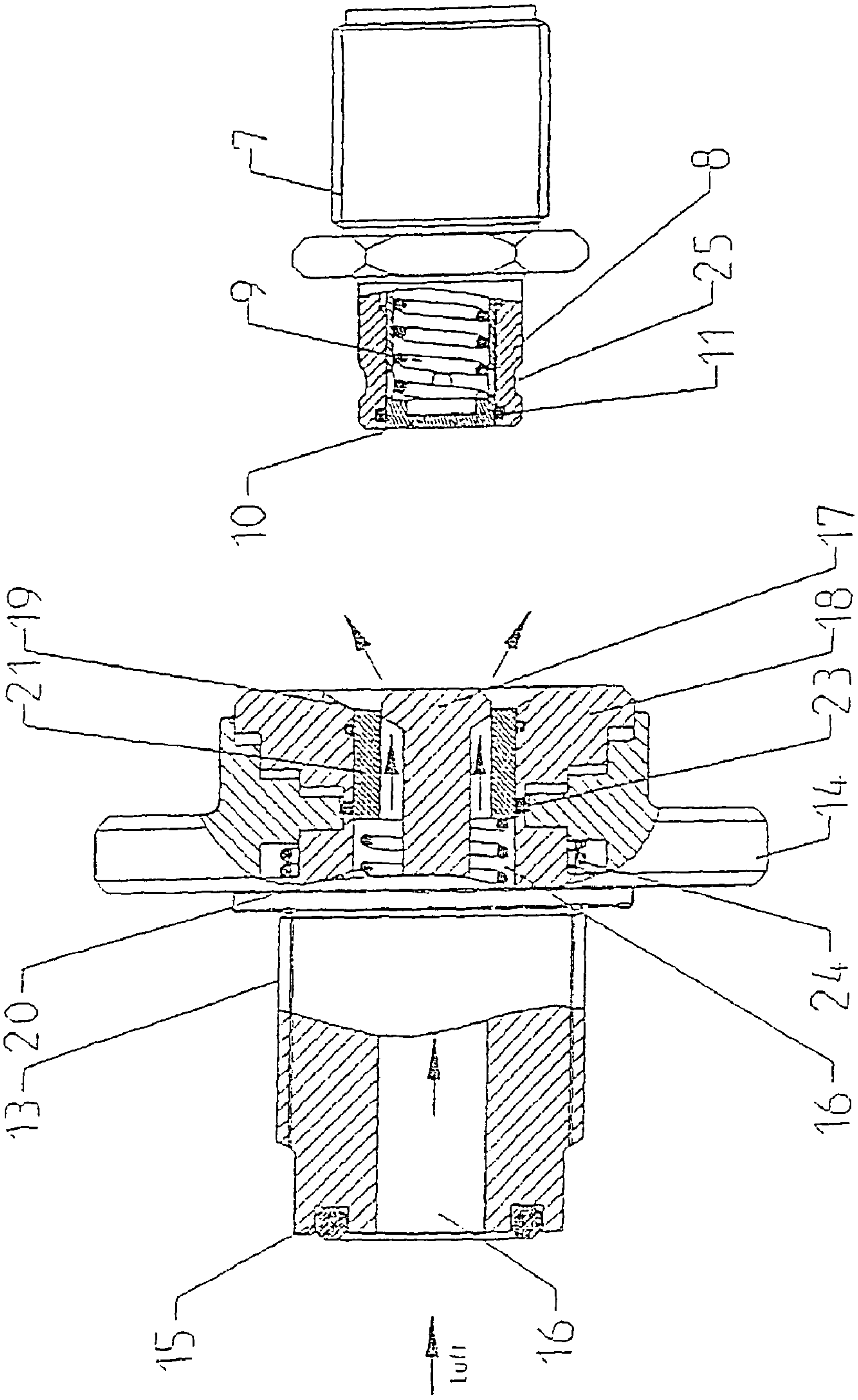
FIG. 3 is a sectional view of the coupling elements when not coupled.
Figure 4:
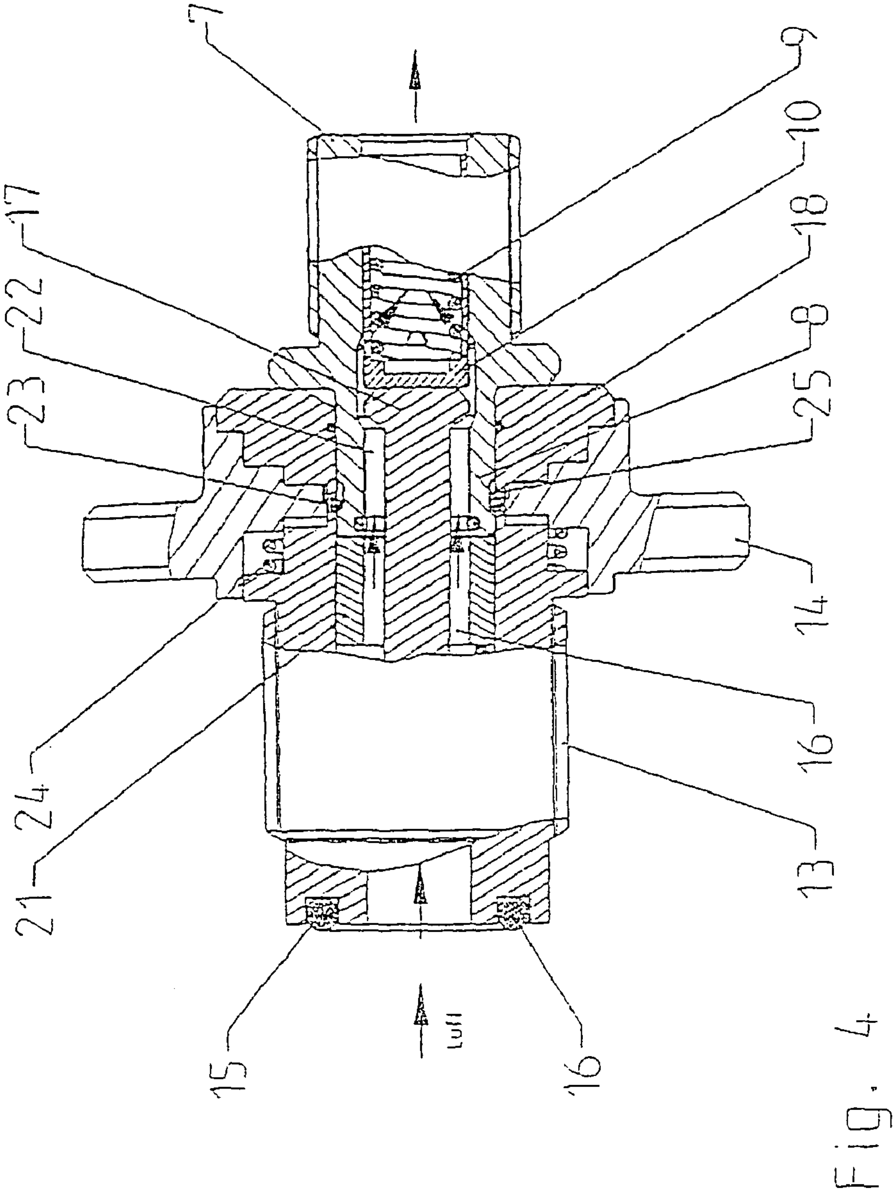
FIG. 4 is a sectional view of the coupling elements in operating condition.

According to FIGS. 1 and 2, the cylinder valve 1 of a compressed air cylinder 2 comprises the typical fitting 3 with a female thread 4. A coupling means 7 comprising a barb nipple 8 is screwed into a threaded hole 5 of the pressure reducer 6. The barb nipple 8 comprises a cap 10 that is subjected to the action of a helical compression spring 9, said cap 10 protecting the pressure reducer 6 in combination with a gasket 11 from contamination when it is not connected to the compressed air cylinder 2. The coupling part 12 that is used to make the connection between the fitting 3 and the barb nipple 8 includes a threaded sleeve 13 that can be screwed into the fitting 3 using a hand wheel 14. Sealing inside the fitting is provided by a gasket 15. The coupling part 12 comprises a plug 17 formed in the air passage hole 16 that forms an annular clearance 19 with a closing ring 18. When not coupled with the barb nipple 8, the annular clearance 19 is shut by a locking ring 21 that is subjected to the action of a helical compression spring 20 and reduces the risk of contamination. Together with the plug 17, this spring-loaded locking ring 21 also forms a blow-off protection that limits the quantity of gas that can escape when the cylinder valve 1 is inadvertently opened in uncoupled condition to ca. 5 l/min and thus reduces the risk of an accident and further makes it possible to disconnect the coupling part 12, if required, from the pressurized compressed air cylinder 2. FIG. 4 shows the coupling part 12 and the barb nipple 8 in coupled—plugged-in—condition. The plug 17 presses the cap 10 back against the action of the helical compression spring 9 in the air passage hole 22 of the barb nipple a while the barb nipple 8 presses the locking ring 21 in the opposite direction against the action of the helical compression spring 20. This opens the way for the compressed air from the compressed air cylinder 2 to the pressure reducer 6 when the cylinder valve 1 is open. FIG. 4 shows that the barb nipple 8 is locked in the coupling part 12 by latching balls 23 held at the inner circumference of the hand wheel 14 and a latching groove 25 running around the outer circumference of the barb nipple 8. It takes two subsequent actions on the user's part, i.e. rotating the pivoted hand wheel 14 and subsequent pulling of the hand wheel 14 against the action of a helical compression spring 24 attached to the coupling 12 to release the latching balls 23 so that the coupling part 12 can be pulled off the barb nipple 8 that is connected to the pressure reducer 6.

The small and handy coupling part 12 can be connected to the compressed air cylinder 2 in a fast, simple, and safe manner and remain connected to it. Connecting the compressed air cylinder 2 equipped with the coupling part 12 to the pressure reducer 6, a manifold or the like that are equipped with the respective barb nipple 8 is really very simple and does not take much time. To make the already simple plugging together of coupling part 12 and barb nipple 8 even easier, both parts may comprise suitable inserting bevels. In addition, it is possible to perform a rotating movement between the compressed air cylinder 2 and the pressure reducer 6, or more precisely between the coupling part 12 and the barb nipple 8. The plug and socket connection cannot disconnect on its own as it is locked using latching balls 23 and as two manual—single-handed—movements are required on the user's part to release the locking, i.e. turning the hand wheel 14 and moving it in longitudinal direction. Both the barb nipple 8 and the coupling part 12 are protected against contamination by the locking ring 21 or the cap 10, respectively. On the other hand, the spring-loaded locking ring 21 lets the air escape slowly only when the cylinder valve 1 is inadvertently opened in non-coupled condition, which prevents accidents and allows disassembly of the coupling part 12 even if the compressed air cylinder is still filled with compressed air.

The invention is not limited to the embodiment described above. The barb nipple may for example be connected to the compressed air cylinder while the coupling part is attached to the pressure reducer.

LIST OF REFERENCE SYMBOLS

1 Cylinder valve
2 Compressed air cylinder
3 Fitting of 2
4 Female thread of 3
5 Threaded hole of 6
6 Pressure reducer, manifold or the like
7 Coupling means of 6
8 Barb nipple
9 Helical compression spring of 8
10 Cap of 8
11 Gasket of 8
12 Coupling part
13 Threaded sleeve of 12
14 Hand wheel
15 Gasket of 13
16 Air passage hole of 12
17 Plug of 12
18 Closing ring of 12
19 Annular clearance betw. 17/18
20 Helical compression spring in 16
21 Locking ring
22 Air passage hole of 8
23 Latching balls
24 Helical compression spring of 14
25 Latching groove

The invention claimed is:

1. A coupling for a compressed air cylinder (2) for connecting the compressed air cylinder (2) to a coupling means (7) that can be coupled with a consumer (6), a manifold, or a filling station, especially for compressed air breathing apparatuses wherein the compressed air cylinder (2) comprises a cylinder valve (1) with a standardized fitting (3), and wherein a separate coupling part (12) that can be screwed into or onto the fitting (3) of the compressed air cylinder (2) can be coupled with the consumer (6), the manifold or filling station via connecting means (17, 18; 8) provided on the coupling part (12) and the coupling means (7) which include, on the coupling part (12), spring-loaded locking means (20, 21) that provide blow-off protection and protection from contamination in uncoupled condition, and, on the coupling means (7), spring-loaded locking elements (9, 10) and means (23, 25) for interlocking the connection between the coupling part (12) and coupling means (7) in coupled condition, the connecting means (17, 18; 8) of the coupling part (12) including a plug (17) located in a closing ring (18) and leaving an annular clearance (19), in which annular clearance a locking ring (21) is located that in uncoupled condition is held between the plug (17) and the closing ring (18) so that a limited volumetric flow of gas can flow off when the compressed air cylinder (2) is open.

2. The coupling according to claim 1, wherein the coupling means (7) comprises a hollow barb nipple (8) with an outer wall which is guided in coupled condition between parts on the connecting means (17, 18) in the coupling part (12) and can be locked in a locking groove (25) by means of latching balls (23) in the coupling part (12).

3. The coupling according to claim 2, wherein the latching balls (23) are in a functional connection with a hand wheel (14) located on the perimeter of the coupling part that can be moved in axial direction against the action of a helical compression spring (24) and rotated so that turning and moving said hand wheel (14) releases the latching balls (23).

4. The coupling according to claim 1, wherein the coupling means (7) comprises a hollow barb nipple (8) with a free end and a cap (10) at the free end of the barb nipple (8) held against a gasket (11) by the action of a helical compression spring (9) in uncoupled condition that is moved in coupled condition by the action of the connecting means (18) in the coupling part (12) into the barb nipple (8), thereby opening the gas passage.

5. The coupling according to claim 1, wherein the locking ring (21) that is located in the annular clearance (19) and held in place in uncoupled condition by the action of a helical compression spring (20) for blow-off protection and protection against contamination, is moved out of the annular clearance in coupled condition by the action of the connecting means (8) of the coupling means (7), thereby completely opening the gas passage.

6. The coupling according to claim 1, wherein the coupling means (7) is a separate component and can be screwed together with the consumer or manifold.

7. The coupling according to any one of the preceding claims, wherein the coupling means (7) comprises a barb nipple (8) and the coupling part (12) may each be connected either to a compressed gas cylinder (1) or to a consumer (6), manifold, or filling station.

* * * * *